United States Patent
Sato et al.

(10) Patent No.: US 7,184,256 B1
(45) Date of Patent: Feb. 27, 2007

(54) HIGH-VOLTAGE FEED-THROUGH CAPACITOR AND MAGNETRON

(75) Inventors: Tsukasa Sato, Tokyo (JP); Yukihiko Shirakawa, Tokyo (JP); Isao Fujiwara, Tokyo (JP); Hisashi Tanaka, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/444,493

(22) Filed: Jun. 1, 2006

(30) Foreign Application Priority Data

Aug. 29, 2005  (JP)  ............................... 2005-247238

(51) Int. Cl.
*H01G 4/35* (2006.01)
*H01G 4/236* (2006.01)

(52) U.S. Cl. ..................................... 361/302; 361/307

(58) Field of Classification Search ................ 361/302, 361/303–305, 306.1, 307
See application file for complete search history.

(56) References Cited

U.S. PATENT DOCUMENTS

| | | | | |
|---|---|---|---|---|
| 4,370,698 A | * | 1/1983 | Sasaki ......................... | 361/330 |
| 4,811,161 A | * | 3/1989 | Sasaki et al. ................ | 361/302 |
| 5,142,436 A | * | 8/1992 | Lee et al. ..................... | 361/302 |
| 6,288,886 B1 | * | 9/2001 | Sato et al. ................... | 361/302 |
| 6,344,962 B2 | * | 2/2002 | Asada et al. ................. | 361/302 |
| 6,909,590 B2 | * | 6/2005 | Sato et al. ................... | 361/302 |
| 7,042,704 B2 | * | 5/2006 | Sato et al. ................... | 361/302 |

FOREIGN PATENT DOCUMENTS

| | | | |
|---|---|---|---|
| JP | 03099414 A | * | 4/1991 |
| JP | 8-78154 | | 3/1996 |

* cited by examiner

*Primary Examiner*—Eric W. Thomas
(74) *Attorney, Agent, or Firm*—Oblon, Spivak, McClelland, Maier & Neustadt, P.C.

(57) ABSTRACT

A high-voltage feed-through capacitor includes: a capacitor element; a grounding metal fitting; an insulating resin; two through conductors; an insulating cover; and an insulating tube. The capacitor element has two separate electrodes on one side and one common electrode on the other side and is mounted on one side of the grounding metal fitting with the common electrode being connected to the same side of the grounding metal fitting. The insulating resin fills a space inside the capacitor element. Each through conductor has a rod-like conductor portion passing through the grounding metal fitting and the capacitor element and connected to the separate electrode. At least a portion of the insulating tube is attached to the rod-like conductor portion within the capacitor element. The insulating cover is attached to the rod-like conductor portion to have one end thereof in contact with one end of the insulating tube.

10 Claims, 10 Drawing Sheets

HIGH-VOLTAGE FEED-THROUGH CAPACITOR AND MAGNETRON

BACKGROUND OF THE INVENTION

1. Field of the Invention

The present invention relates to a high-voltage feed-through capacitor and a magnetron using the high-voltage feed-through capacitor.

2. Description of the Related Art

High-voltage feed-through capacitors have been developed to be incorporated into a magnetron as a filter for eliminating unwanted radiation waves generated by oscillation of the magnetron. For example, Japanese Unexamined Patent Application Publication No. 8-078154 discloses a typical construction of such a high-voltage feed-through capacitor.

In the high-voltage feed-through capacitor of this type, since high voltage is to be applied between a grounding metal fitting and a through conductor, it is required to ensure a sufficient withstand voltage between them. In JP 8-078154, for example, a tubular insulating cover is fitted in a recessed portion which is formed on one side of the grounding metal fitting opposite a raised portion, thereby providing a sufficient creeping distance between the grounding metal fitting and the through conductor for insulation.

In the construction disclosed in JP 8-078154, however, the insulating cover, which is adapted to be fitted in the recessed portion of the grounding metal fitting, has a large bottom area. In addition, the tubular insulating cover is so tall as to provide a sufficient creeping distance. Therefore, it is difficult to reduce the external size of the high-voltage feed-through capacitor below the grounding metal fitting.

In the construction disclosed in JP 8-078154, moreover, since the insulating cover is adapted to be fixed to the grounding metal fitting, an insulating resin has to be applied not only to the space inside the capacitor element but also to the space inside the insulating cover. Therefore, the filling amount of the insulating resin necessarily increases, which increases cost and also makes the high-voltage feed-through capacitor susceptible to the thermal expansion/contraction of the insulating resin. Stress caused by the thermal expansion/contraction of the insulating resin may decrease the withstand voltage.

SUMMARY OF THE INVENTION

It is an object of the present invention to provide a high-voltage feed-through capacitor which can achieve miniaturization for cost reduction and also improve reliability and a magnetron using the high-voltage feed-through capacitor.

To achieve the above-mentioned object, the present invention provides a high-voltage feed-through capacitor comprising: a capacitor element; a grounding metal fitting; an insulating resin; two through conductors; an insulating cover; and an insulating tube. The capacitor element has two separate electrodes on one side and one common electrode on the other side and is mounted on one side of the grounding metal fitting with the common electrode being connected to the same side of the grounding metal fitting. The insulating resin fills a space inside the capacitor element. Each through conductor has a rod-like conductor portion passing through the grounding metal fitting and the capacitor element and connected to the separate electrode. At least a portion of the insulating tube is attached to the rod-like conductor portion within the capacitor element.

The above-described construction is an elemental construction of conventional high-voltage feed-through capacitors. The feature of the present invention resides in that an improvement has been made in the above-described construction with respect to disposition of the insulating cover. In the present invention, specifically, the insulating cover is attached to the rod-like conductor portion of the through conductor to have one end thereof in contact with one end of the insulating tube.

In the above-described construction, since the insulating cover is attached to the rod-like conductor portion, a sufficient withstand voltage can be ensured between the grounding metal fitting and the through conductor depending on the attached state and the thickness. Since the insulating cover is attached to the rod-like conductor portion, moreover, the bottom area defined by the wall surface of the insulating cover can be minimized to achieve miniaturization of the high-voltage feed-through capacitor.

Furthermore, since the insulating cover is attached to the rod-like conductor portion, it is not necessary to fix the insulating cover to the grounding metal fitting. In the high-voltage feed-through capacitor of the present invention, therefore, there is no need to apply the insulating resin to the space inside the insulating cover, unlike in JP 8-078154, which decreases the filling amount of the insulating resin to reduce cost and also reduces the impact of the thermal expansion/contraction of the insulating resin to improve reliability.

According to one preferred embodiment of the high-voltage feed-through capacitor, a seam between the insulating cover and the insulating tube may be buried in the insulating resin. With this construction, the insulating cover can be securely held with the insulating resin.

According to another preferred embodiment of the high-voltage feed-through capacitor, the insulating cover may have a fit with the insulating tube. In this construction, the fit between insulating cover and the insulating tube prevents the insulating resin from penetrating to the surface of the rod-like conductor portion at the seam, thereby preventing the insulating tube and the insulating cover from falling off the through conductor.

The present invention also provides a magnetron in which the above-described high-voltage feed-through capacitor is incorporated as a filter. Therefore, the magnetron has the same advantages as the high-voltage feed-through capacitor.

As has been described hereinabove, the present invention provides a high-voltage feed-through capacitor which can achieve miniaturization for cost reduction and also improve reliability and a magnetron using the high-voltage feed-through capacitor.

The present invention will be more fully understood from the detailed description given hereinbelow and the accompanying drawings which are given by way of illustration only, and thus not to be considered as limiting the present invention.

DESCRIPTION OF THE PREFERRED EMBODIMENTS

Figure 1:
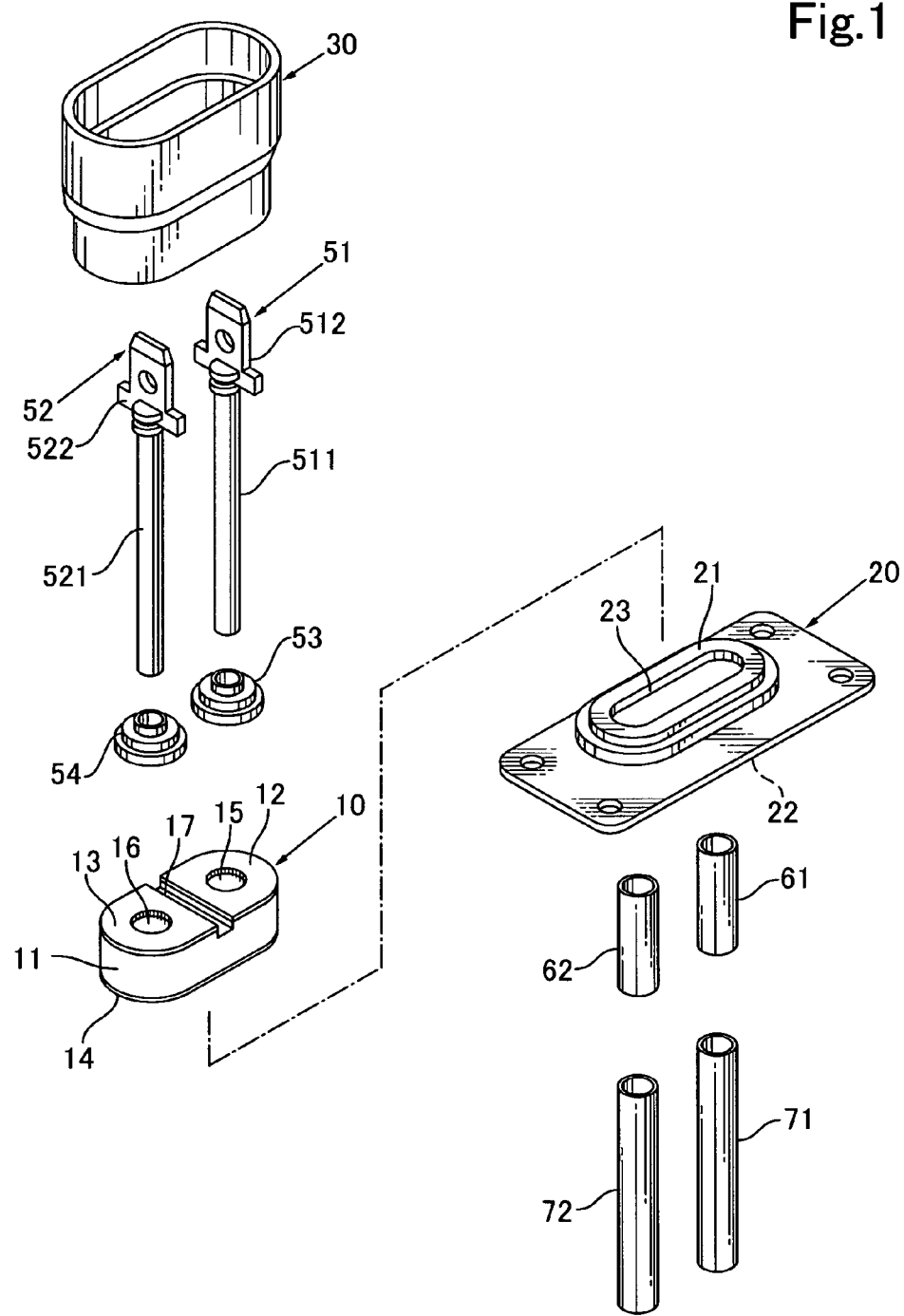
FIG. 1 is an exploded perspective view of a high-voltage feed-through capacitor according to one embodiment of the present invention.
Figure 2:
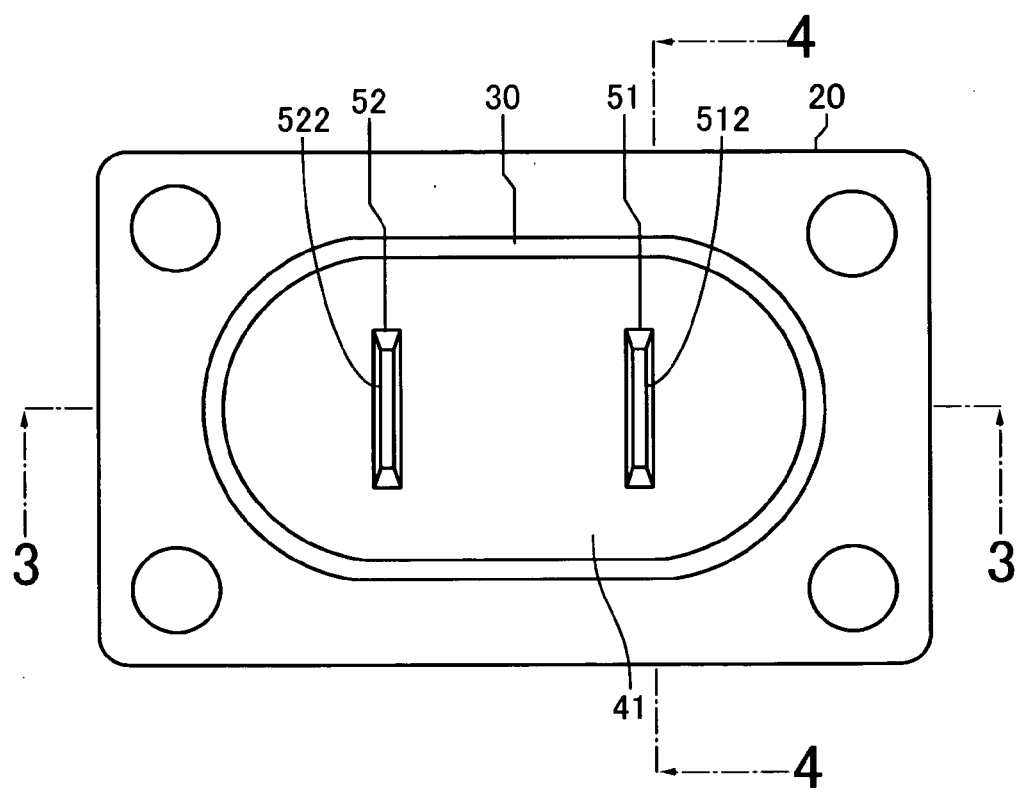
FIG. 2 is a plan view showing an assembled state of the high-voltage feed-through capacitor shown in FIG. 1.

Referring to FIGS. 1 to 4, a high-voltage feed-through capacitor according to one embodiment of the present invention includes a capacitor element 10, a grounding metal fitting 20, an insulating case 30, first and second insulating resins 41, 42, through conductors 51, 52, insulating tubes 61, 62 and insulating covers 71, 72.

The capacitor element 10 includes a dielectric porcelain 11, two separate electrodes 12, 13 and a common electrode 14. The dielectric porcelain 11 is formed with two through holes 15, 16. The composition of the dielectric porcelain 11 is arbitrary. Specific examples include the composition whose main constituent is $BaTiO_3$—$BaZrO_3$—$CaTiO_3$ with a single or a plurality of additives mixed in. It is desirable that the dielectric porcelain 11 is adequately rounded out to prevent a mechanical or electrical stress concentration.

The separate electrodes 12, 13 are provided on one side of the dielectric porcelain 11 to enclose the openings of the through holes 15, 16. The separate electrodes 12, 13 are spaced apart by a depression 17. Although not illustrated in the drawings, the depression 17 may be substituted by a projection. Since the depression 17 is provided to increase the creeping distance between the separate electrodes 12, 13, the width and depth of the depression 17 may be determined so as to ensure a desired creeping distance. The common electrode 14 is provided on the other side of the dielectric porcelain 11.

The capacitor element 10 is mounted on one side of the grounding metal fitting 20 with the common electrode 14 being connected to the same side of the grounding metal fitting 20. More specifically, the illustrated grounding metal fitting 20, which may be constituted of a conductive metallic material such as iron, copper, brass or the like, has a raised portion 21, a recessed portion 22 and an opening 23. The raised portion 21 is formed on one side of the grounding metal fitting 20, thereby providing the corresponding recessed portion 22 on the other side of the grounding metal fitting 20. The opening 23 passes through the grounding metal fitting 20 from one side to the other within the area of the raised portion 21. On the raised portion 21, there is mounted the capacitor element 10. The common electrode 14 of the capacitor element 10 is electrically and mechanically connected onto the raised portion 21 by means of soldering or the like.

The insulating case 30, which may be constituted of polyethylene terephthalate (PET), polybutylene terephthalate (PBT), modified melanine or the like, is provided on one side of the grounding metal fitting 20 with its one end fitted around the periphery of the raised portion 21.

The two through conductors 51, 52 may be constituted of a conductive metallic material such as iron, copper, brass or the like. The illustrated through conductor 51 has a rod-like conductor portion 511 and a tab terminal portion 512 which functions as a tab connector, wherein the rod-like conductor portion 511 and the tab terminal portion 512 are connected together by a caulking member 513. Similarly, the through conductor 52 has a rod-like conductor portion 521 and a tab terminal portion 522, wherein the rod-like conductor portion 521 and the tab terminal portion 522 are connected together by a caulking member 523.

The through conductors 51, 52 are disposed such that the rod-like conductor portions 511, 521 are passed through electrode connectors 53, 54, the through holes 15, 16 of the capacitor element 10 and the opening 23 of the grounding metal fitting 20 while the proximal ends of the tab terminal portions 512, 522 are secured to the electrode connectors 53, 54 by means of soldering or the like, so that the through conductors 51, 52 are electrically and mechanically connected to the separate electrodes 12, 13 through the electrode connectors 53, 54.

Of the rod-like conductor portions 511, 521, at least portions passing through the through holes 15, 16 of the capacitor element 10 are covered with the insulating tubes 61, 62. More specifically, the insulating tubes 61, 62, which may be constituted of a silicone rubber or the like, are at least partially attached to the rod-like conductor portions 511, 521 within the capacitor element 10 and buried in the first insulating resin 41.

The first insulating resin 41 fills not only a space inside the capacitor element 10 but also a space inside the opening 23 of the grounding metal fitting 20. On the other hand, the second insulating resin 42 is applied to enclose the capacitor element 10. More specifically, the second insulating resin 42 fills a space inside the insulating case 30 from one surface of the grounding metal fitting 20 to a level above the caulking members 513, 523. The first and second insulating resins 41, 42 may be constituted of a thermo-setting resin such as a urethane resin or an epoxy resin, a phenol resin, a silicone resin or the like.

The above-described construction is widely known in conventional high-voltage feed-through capacitors. The illustrated high-voltage feed-through capacitor according to one embodiment of the present invention is characterized by disposition of the insulating covers 71, 72 in the above-described essential construction of conventional high-voltage feed-through capacitors. In this regard, detailed description will be made with reference to FIG. 5. FIG. 5 is an enlarged view showing an area "a" which is enclosed in a circle by alternate long and short dashed lines in the high-voltage feed-through capacitor shown in FIG. 4.

Referring to FIG. 5, the insulating covers 71, 72, which may be constituted of polyethylene terephthalate (PET), polybutylene terephthalate (PBT), modified melanin or the like, are preferably in the form of a cylinder or tube and provided on a lower side of the grounding metal fitting 20 to cover portions of the rod-like conductor portions 511, 521, wherein one ends (e.g., upper ends) of the insulating covers 71, 72 are in contact with one ends (e.g., lower ends) of the insulating tubes 61, 62. At these upper ends, more specifically, the insulating covers 71, 72 have recessed portions 710, 720 along their inner peripheries. The insulating covers 71, 72 are attached to the rod-like conductor portions 511, 521 with the recessed portions 710, 720 directed toward the insulating tubes 61, 62. The recessed portions 710, 720 have a tight fit around the lower ends of the insulating tubes 61, 62, so that the lower ends of the insulating tubes 61, 62 are covered with the upper ends of the insulating covers 71, 72.

Particularly at the joints when the lower code of the insulating tubes 61, 62 are fitted in the upper ends of the insulating covers 71, 72, the first insulating resin 41, which fills both the space inside the capacitor element 10 and the space inside the opening 23 of the grounding metal fitting 20, covers the seams between the insulating tubes 61, 62 and the insulating covers 71, 72.

Figure 3:
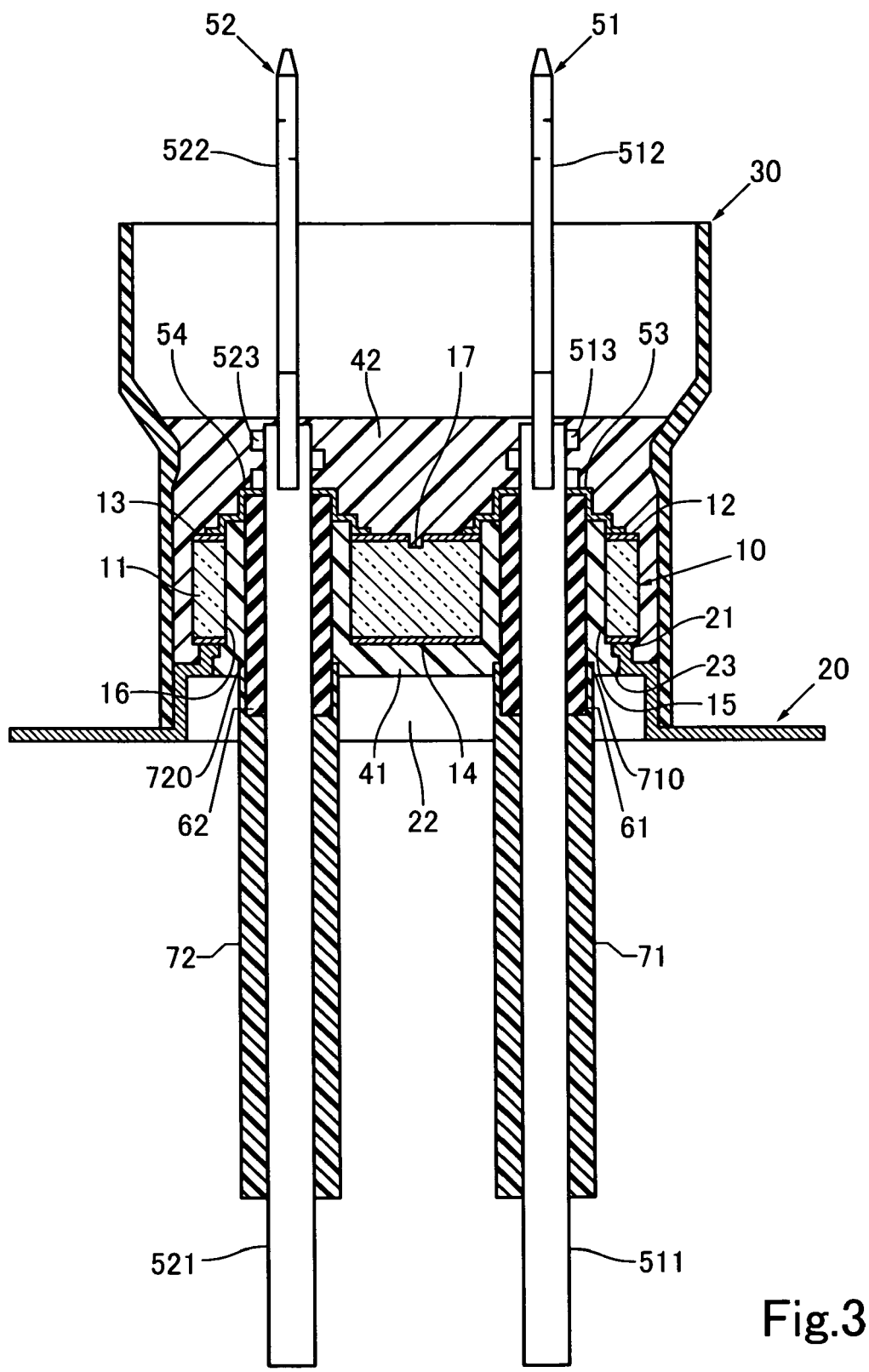
FIG. 3 is a partially sectional view taken along line 3—3 of FIG. 2.
Figure 4:
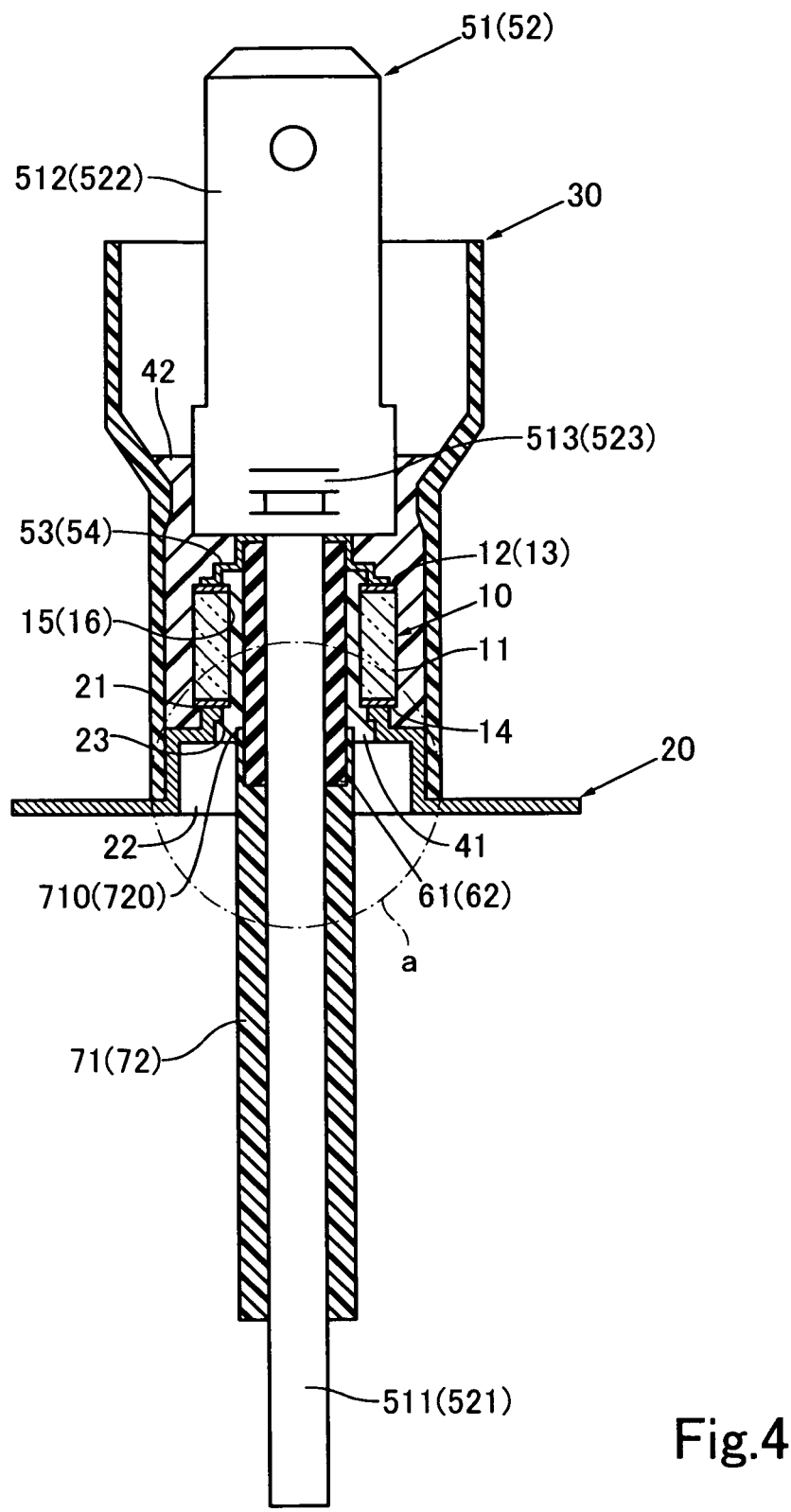
FIG. 4 is a partially sectional view taken along line 4—4 of FIG. 2.
Figure 5:
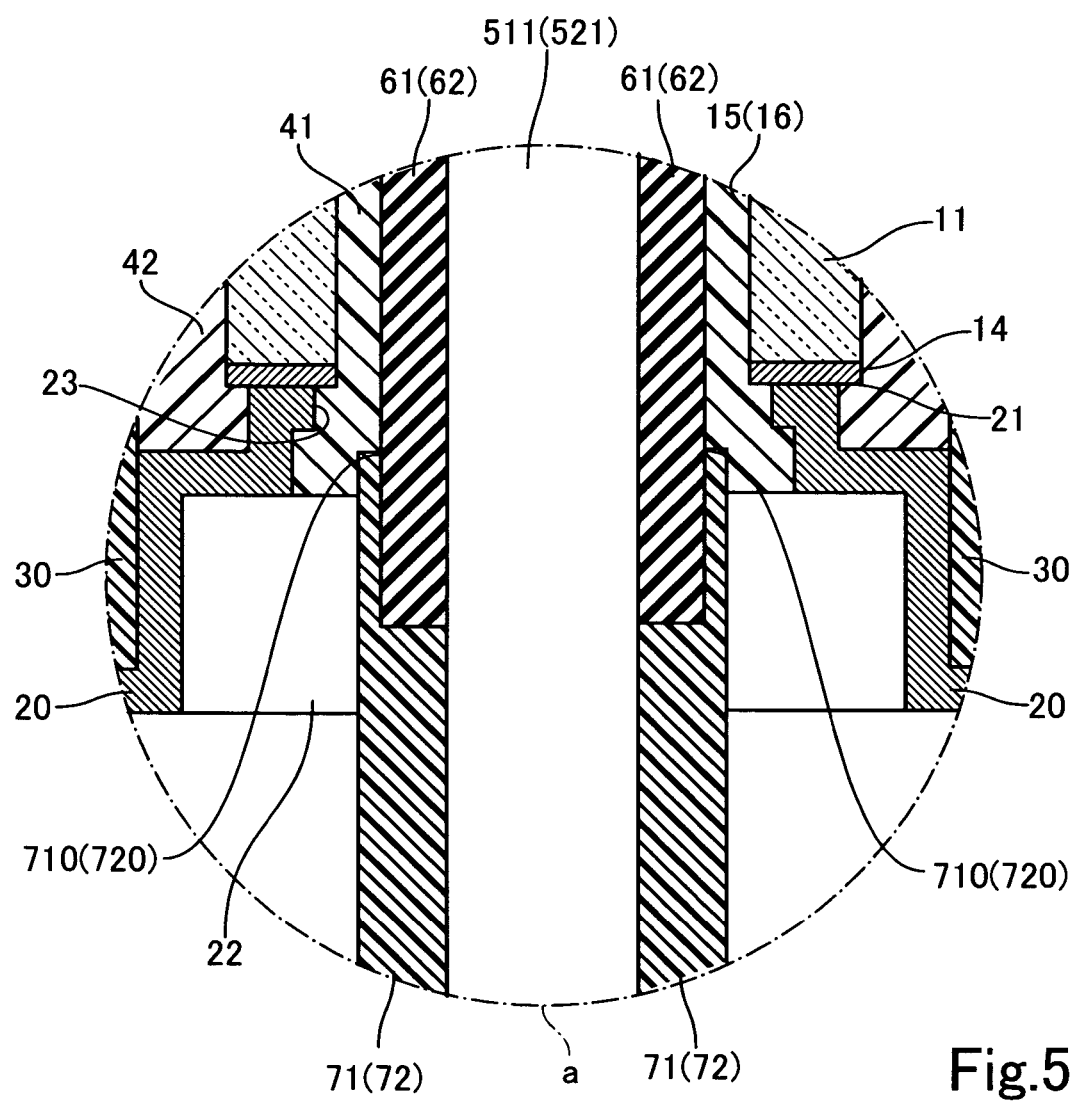
FIG. 5 is an enlarged view showing a part of the high-voltage feed-through capacitor shown in FIG. 4.

In the high-voltage feed-through capacitor shown in FIGS. 3 to 5, although the recessed portions 710, 720 are formed in the upper ends of the insulating covers 71, 72, such recessed portions may be formed in the lower ends of the insulating tubes 61, 62. Alternatively, both the upper ends of the insulating covers 71, 72 and the lower ends of the insulating tubes 61, 62 may have recessed portions to mate with each other.

In the above-described construction, since the insulating covers 71, 72 are in the form of a cylinder or tube and are attached to partially cover the rod-like conductor portions 511, 521, the insulating covers 71, 72 ensure a sufficient withstand voltage between the grounding metal fitting 20 and the through conductors 51, 52, within a quantitative limit corresponding to the attached state and the thickness.

Since the insulating covers 71, 72 are attached to the rod-like conductor portions 511, 521, moreover, the bottom area defined by the wall surfaces of the insulating covers 71, 72 can be minimized to achieve miniaturization of the high-voltage feed-through capacitor.

Furthermore, since the insulating covers 71, 72 are attached to cover the rod-like conductor portions 511, 521, it is not necessary to fix the insulating covers 71, 72 to the grounding metal fitting 20. In the high-voltage feed-through capacitor according to one embodiment of the present invention, accordingly, there is no need to fill the insulating covers 71, 72 with the first insulating resin 41, unlike in JP 8-078154, which decreases the filling amount of the first insulating resin 41 to reduce cost and also makes the high-voltage feed-through capacitor less susceptible to the thermal expansion/contraction of the insulating resin to improve reliability.

In the high-voltage feed-through capacitor according to one embodiment of the present invention, still furthermore, since the upper ends of the insulating covers 71, 72 are in contact with the lower ends of the insulating tubes 61, 62 and the seams between the insulating covers 71, 72 and the insulating tubes 61, 62 are buried in the first insulating resin 41, the insulating covers 71, 72 can be securely held with the first insulating resin 41.

In addition, since the recessed portions 710, 720 make a tight fit at the joints where the insulating covers 71, 72 are in contact with the insulating tubes 61, 62, the first insulating resin 41 is prevented from penetrating to the surfaces of the rod-like conductor portions 511, 521 at the seams. This prevents the insulating tubes 61, 62 and the insulating covers 71, 72 from falling off the through conductors 51, 52.

In the construction shown in FIGS. 1 to 5, since the insulating covers 71, 72 are adapted to be attached to the rod-like conductor portions 511, 521, the insulating covers 71, 72 can easily be assembled in the high-voltage feed-through capacitor.

Figure 6:
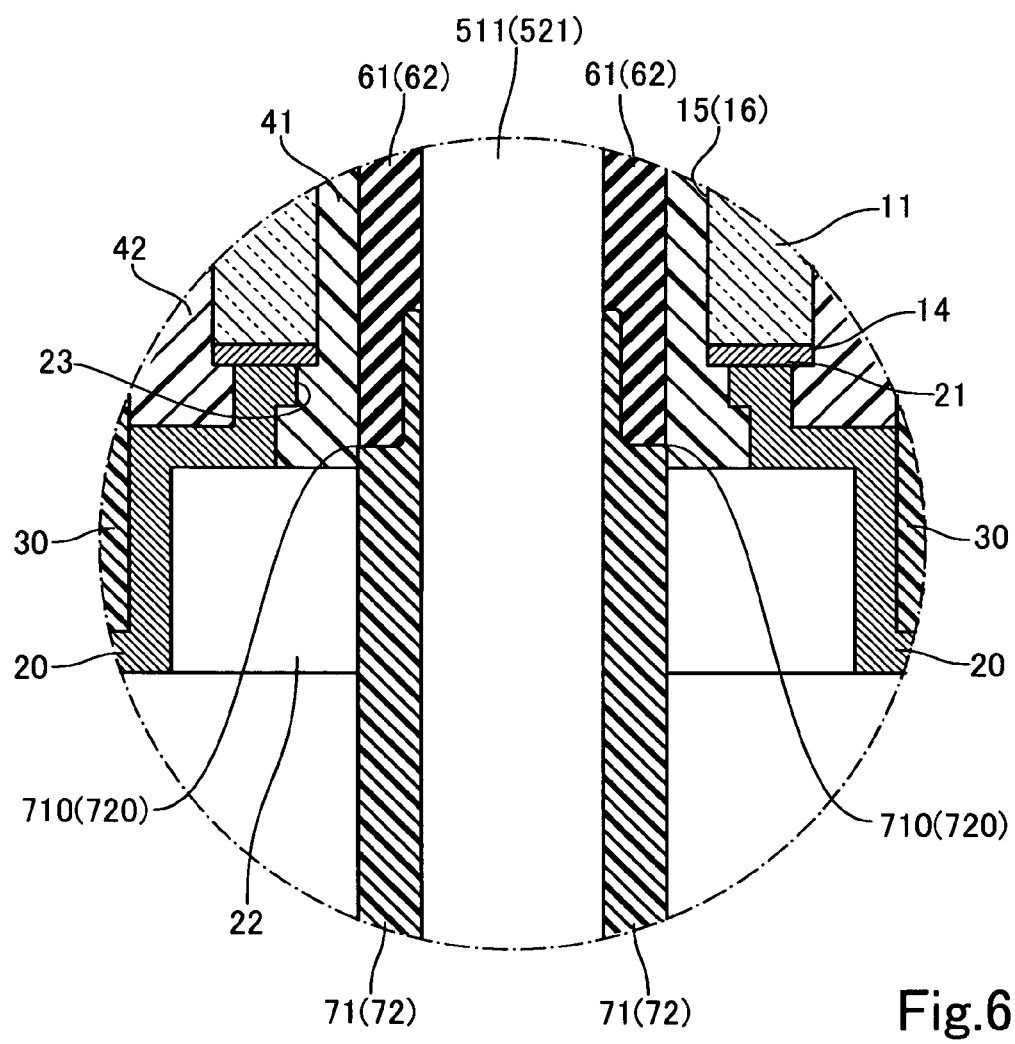
FIG. 6 is an enlarged view showing a part of a high-voltage feed-through capacitor according to another embodiment of the present invention.

Now a high-voltage feed-through capacitor according to another embodiment of the present invention will be described with reference to FIG. 6. FIG. 6 shows a part of the high-voltage feed-through capacitor on an enlarged scale. In FIG. 6, the portions corresponding to the components shown in FIGS. 1 to 5 are designated by the same reference numerals.

The embodiment shown in FIG. 6 is similar to the embodiment shown in FIG. 5 in that the recessed portions 710, 720 make a tight fit at the joints where the insulating covers 71, 72 are in contact with the insulating tubes 61, 62 and the seams between the insulating covers 71, 72 and the insulating tubes 61, 62 are buried in the first insulting resin 41, but differs from the embodiment shown in FIG. 5 in that the recessed portions 710, 720 are formed along the outer peripheries at the upper ends of the insulating covers 71, 72. In the embodiment shown in FIG. 6, accordingly, the recessed portions 710, 720 have a tight fit in the lower ends of the insulating tubes 61, 62, so that the upper ends of the insulating covers 71, 72 are covered with the lower ends of the insulating tubes 61, 62. This embodiment has the same effects and advantages as the embodiment shown in FIGS. 1 to 5.

Figure 7:
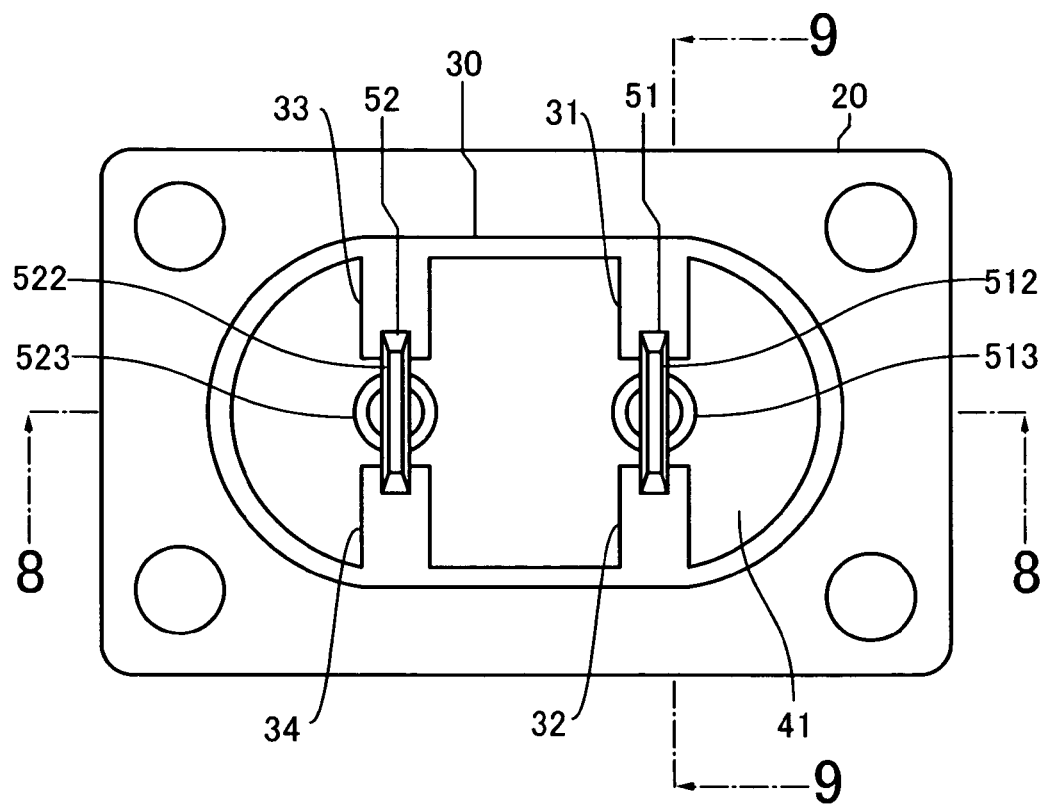
FIG. 7 is a plan view of a high-voltage feed-through capacitor according to still another embodiment of the present invention.
Figure 8:
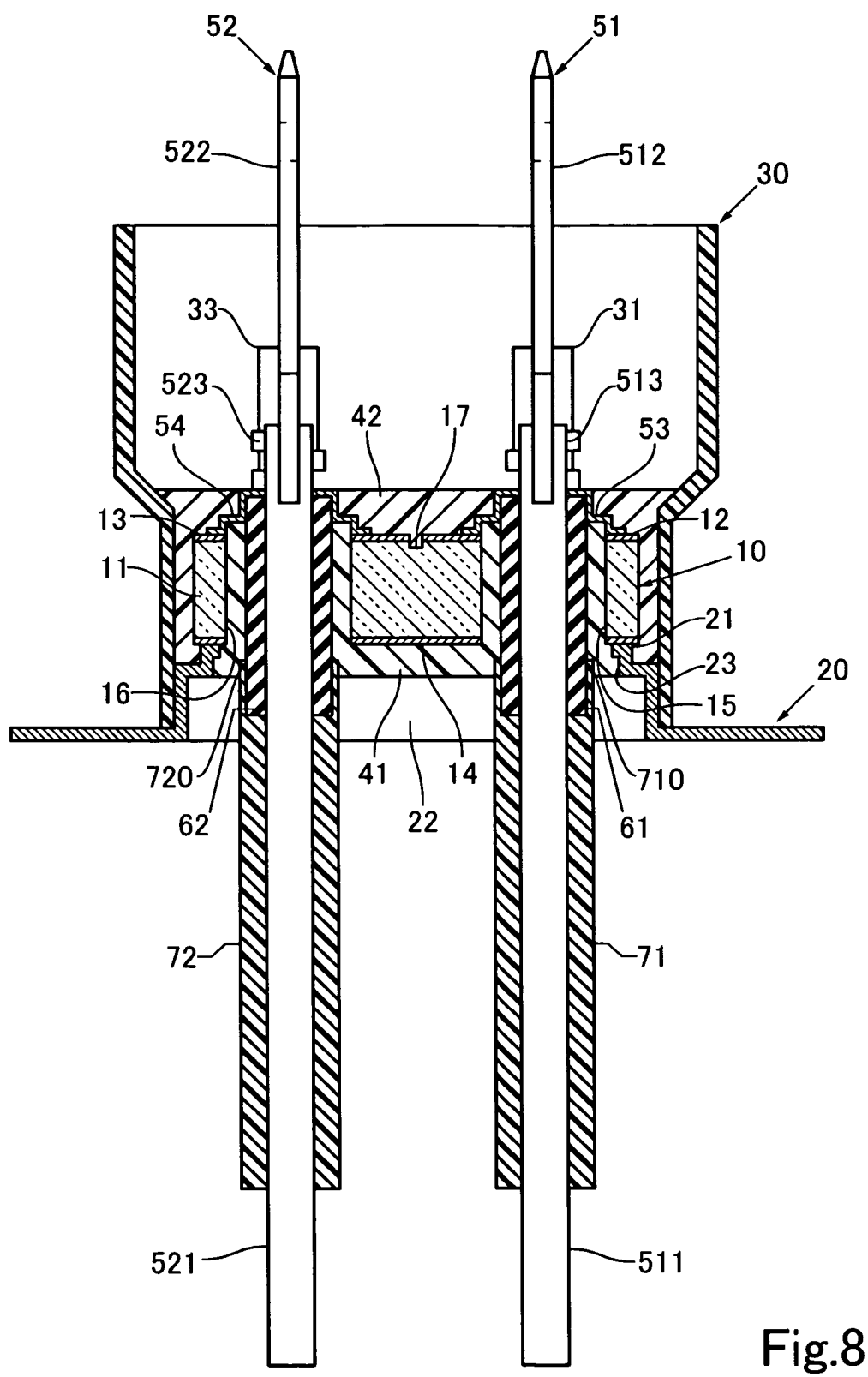
FIG. 8 is a partially sectional view taken along line 8—8 of FIG. 7.
Figure 9:
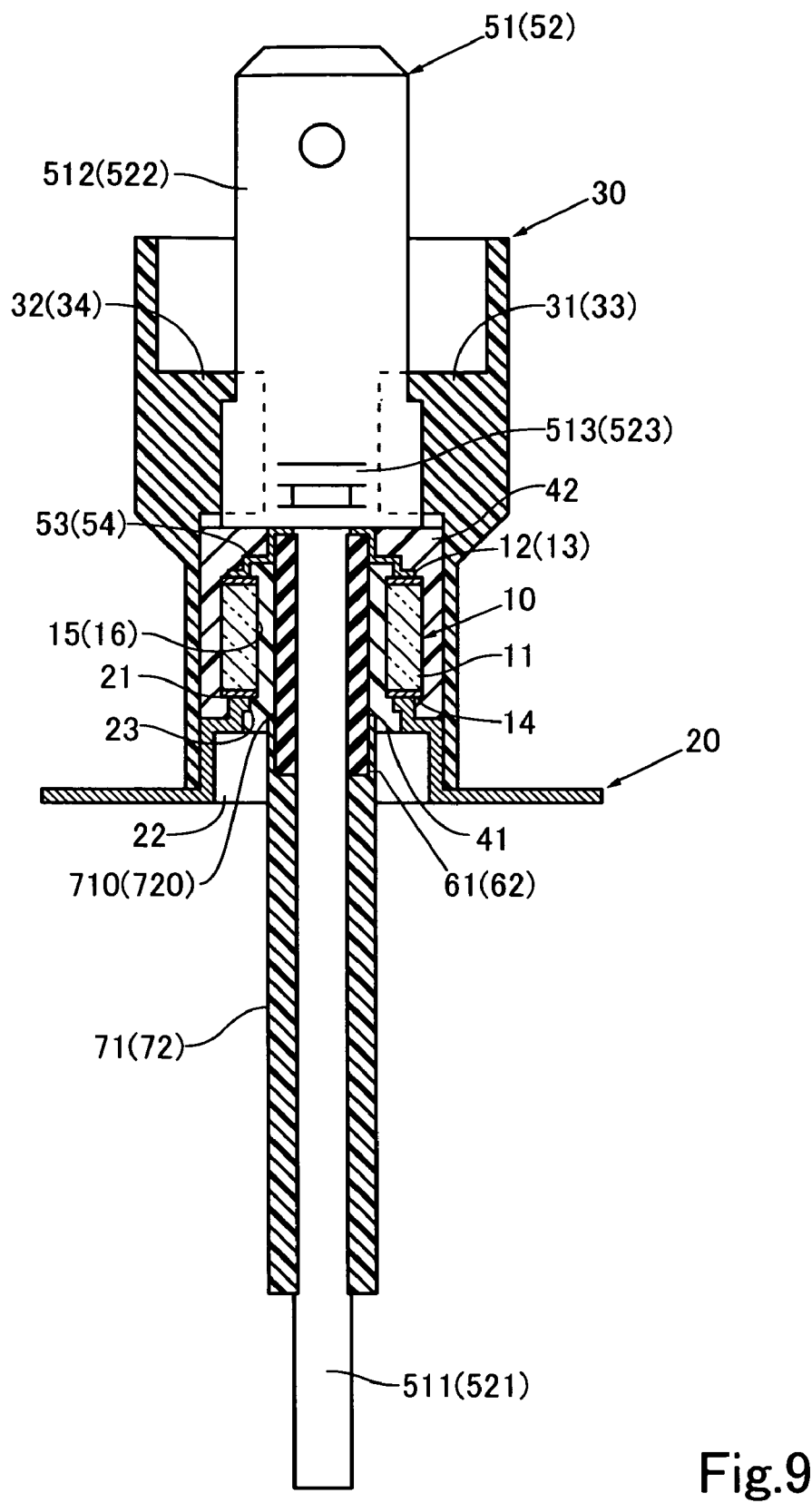
FIG. 9 is a partially sectional view taken along line 9—9 of FIG. 7.

FIG. 7 is a plan view of a high-voltage feed-through capacitor according to still another embodiment of the present invention, FIG. 8 is a partially sectional view taken along line 8—8 of FIG. 7, and FIG. 9 is a partially sectional view taken along line 9—9 of FIG. 7. In FIGS. 7 to 9, the portions corresponding to the components shown in FIGS. 1 to 6 are designated by the same reference numerals.

The high-voltage feed-through capacitor shown in FIGS. 7 to 9, which has a similar construction to the high-voltage feed-through capacitor described hereinabove with reference to FIGS. 1 to 6, is further characterized in that an improvement has been made in the structure of the insulating case 30 and the relationship between the insulating case 30 and the through conductors 51, 52. In the embodiment shown in FIGS. 7 to 9, the insulating case 30 has support members 31 to 34 within, and the tab terminal portions 512, 522 of the through conductors 51, 52 are secured by the support members 31 to 34.

More specifically, the support members 31, 32 project from the inner surface of the insulating case 30 at locations which face laterally opposite sides of the tab terminal portion 512 and are spaced from the upper end of the insulating case 30. The support members 31, 32 are adapted to support the laterally opposite sides of the tab terminal portion 512 in both the lateral and thickness directions. Likewise, the support members 33, 34 project from the inner surface of the insulating case 30 at locations which face laterally opposite sides of the tab terminal portion 522 and are spaced from the upper end of the insulating case 30. The support members 33, 34 are adapted to support the laterally opposite sides of the tab terminal portion 522 in both the lateral and thickness directions.

In the embodiment shown in FIGS. 7 to 9, the upper ends of the insulating covers 71, 72 are brought into contact with and fitted around the lower ends of the insulating tubes 61, 62 as in the embodiments shown in FIGS. 1 to 6. Therefore, this embodiment has the same effects and advantages as the embodiments shown in FIGS. 1 to 6.

In the embodiment shown in FIGS. 7 to 9, furthermore, since the insulating case 30 has the support members 31 to 34 within and the tab terminal portions 512, 522 are secured by the support members 31 to 34, the mechanical strength of the tab terminal portions 512, 522 (to which connectors of a magnetron are to be connected) can be ensured by the support members 31 to 34 provided within the insulating case 30. Therefore, even if the filling amount of the second insulating resin 42 is decreased, the through conductors 51, 52 can obtain a sufficient mechanical strength. Decreasing the filling amount of the second insulating resin 42 leads to relieving stress, improving reliability, and reducing cost.

In the embodiment shown in FIGS. 7 to 9, more specifically, the surface of the second insulating resin 42 may be lowered to a level below the caulking members 513, 523, while, in conventional high-voltage feed-through capacitors, the second insulating resin 42 needs to be applied to such a level as to cover the caulking members 513, 523, as in the embodiments shown in FIGS. 1 to 6.

The high-voltage feed-through capacitors described hereinabove with reference to FIGS. 1 to 9 may constitute a magnetron in conjunction with a cathode stem and a filter box.

Figure 10:
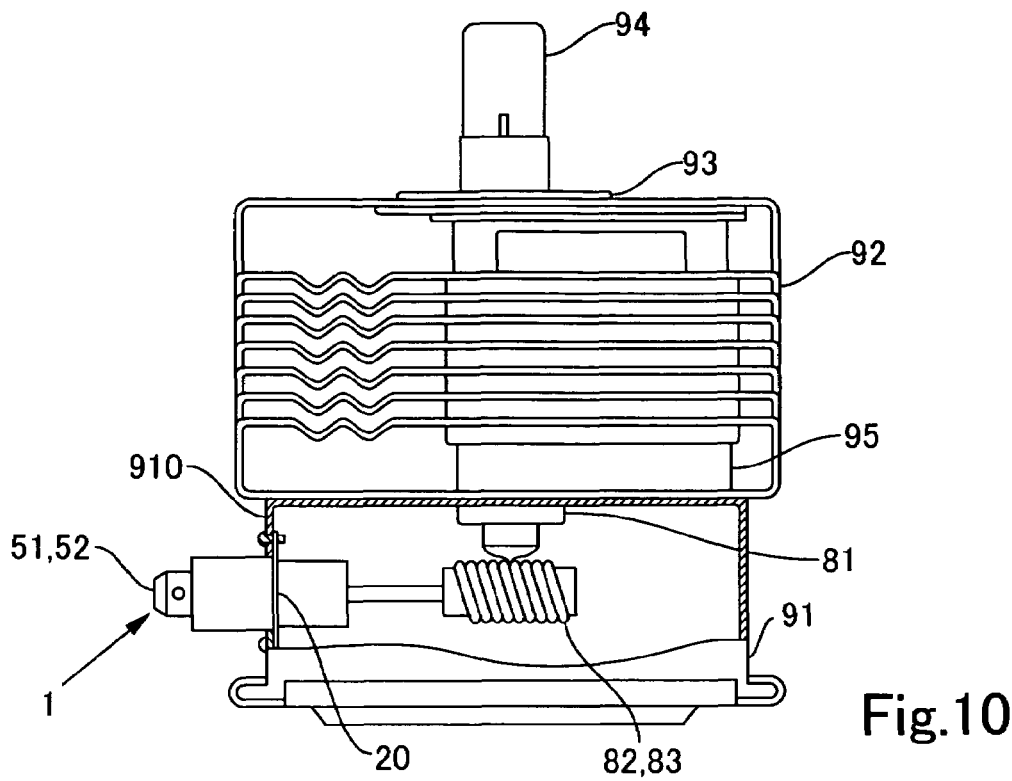
FIG. 10 is a partial cut-away view of a magnetron according to one embodiment of the present invention.
Figure 11:
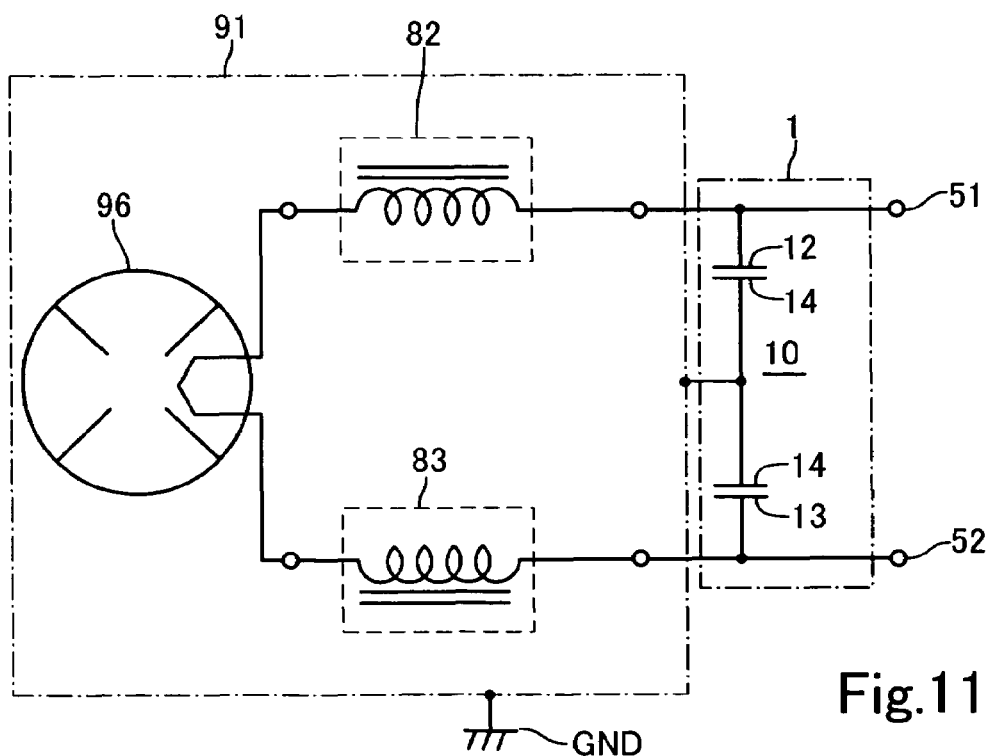
FIG. 11 is an electrical diagram of the magnetron shown in FIG. 10.

Now there will be described a magnetron employing a high-voltage feed-through capacitor according to one embodiment of the present invention. FIG. 10 is a partial cut-away view of a magnetron according to one embodiment of the present invention, and FIG. 11 is an electrical diagram of the magnetron shown in FIG. 10. The magnetron shown in FIG. 10 is, for example, employed in a microwave oven and includes a high-voltage feed-through capacitor 1, a cathode stem 81 and a filter box 91.

The filter box 91 is disposed to enclose the cathode stem 81 and connected to a ground electrode, GND (see FIG. 11). The filter box 91 is provided with a cooling fin 92, a gasket 93, an RF output and 94 and a magnet 95.

The high-voltage feed-through capacitor 1 is provided passing through a through hole formed in a side plate 910 of the filter box 91 with its grounding metal fitting 20 being electrically and mechanically connected to the side plate 910.

Inductors 82 and 83 are connected to the cathode terminal of the cathode stem 81 and the high-voltage feed-through capacitor 1 inside the filter box 91.

Referring to FIG. 11, the high-voltage feed-through capacitor 1 constitutes a filter in conjunction with the inductors 82, 83. The portions corresponding to the components shown in FIGS. 1 to 9 are designated by the same reference numerals. One ends of the inductors 82, 83 are led to an oscillator 96. The other ends of the inductors 82, 83 are led to the separate electrodes 12, 13, respectively.

In the magnetron, for example, a high voltage of approximately 4 $kV_{O-P}$ having a commercial frequency or a frequency within a range of 20 to 40 kHz is applied to the through conductors 51, 52. This causes the magnetron to oscillate and generate a noise. The generated noise can be reduced through the filtering effect achieved by the high-voltage feed-through capacitor 1.

While the present invention has been particularly shown and described with respect to preferred embodiments thereof, it will be understood by those skilled in the art that various changes in form and detail may be made therein without departing from the spirit, scope and teaching of the invention.

What is claimed is:

1. A high-voltage feed-through capacitor comprising:
a grounding metal fitting;
a capacitor element which has two separate electrodes on one side and one common electrode on the other side, said capacitor element being mounted on one side of said grounding metal fitting with said common electrode being connected to the same side of said grounding metal fitting;
an insulating resin which fills a space inside said capacitor element;
two through conductors, each of which has a rod-like conductor portion passing through said grounding metal fitting and said capacitor element and connected to said separate electrode;
an insulating tube, at least a portion of which is attached to said rod-like conductor portion within said capacitor element; and
an insulating cover which is attached to said rod-like conductor portion to have one end thereof in contact with one end of said insulating tube.

2. The high-voltage feed-through capacitor of claim 1, wherein said one end of said insulating cover has a fit with said one end of said insulating tube.

3. The high-voltage feed-through capacitor of claim 2, wherein said one end of said insulating tube has a recessed portion for achieving the fit.

4. The high-voltage feed-through capacitor of claim 2, wherein said one end of said insulating cover has a recessed portion along an inner periphery thereof, and said insulating cover is attached to said rod-like conductor portion with said recessed portion directed toward the insulating tube,
wherein said recessed portion has a tight fit around said one end of said insulating tube, so that said one end of said insulating tube is covered with said one end of said insulating cover.

5. The high-voltage feed-through capacitor of claim 2, wherein said one end of said insulating cover has a recessed portion along an outer periphery thereof, and said insulating cover is attached to said rod-like conductor portion with said recessed portion directed toward the insulating tube,
wherein said recessed portion has a tight fit in said one end of said insulating tube, so that said one end of said insulating cover is covered with said one end of said insulating tube.

6. The high-voltage feed-through capacitor of claim 2, wherein both said one end of said insulating cover and said one end of said insulating tube have recessed portions to mate with each other.

7. The high-voltage feed-through capacitor of claim 1, wherein a seam between said insulating cover and said insulating tube is buried in said insulating resin.

8. The high-voltage feed-through capacitor of claim 1, which is further provided with an insulating case on one side of said grounding metal fitting,
wherein said insulating case has a support member within, and said through conductors are secured by said support member.

9. The high-voltage feed-through capacitor of claim 2, which is further provided with an insulating case on one side of said grounding metal fitting,
wherein said insulating case has a support member within, and said through conductors are secured by said support member.

10. A magnetron including said high-voltage feed-through capacitor of claim 1, wherein said high-voltage feed-through capacitor is incorporated as a filter.

* * * * *